UNITED STATES PATENT OFFICE.

FRANK A. GOOCH, OF NEW HAVEN, CONNECTICUT.

ART OF SOLDERING ALUMINIUM.

SPECIFICATION forming part of Letters Patent No. 597,111, dated January 11, 1898.

Application filed March 26, 1895. Serial No. 543,258. (No specimens.)

*To all whom it may concern:*

Be it known that I, FRANK A. GOOCH, of the city of New Haven, in the county of New Haven and State of Connecticut, have invented certain new and useful Improvements in Fluxes for Soldering Aluminium; and I do hereby declare the following to be a full, clear, and exact description of the invention, such as will enable others skilled in the art to which it appertains to make and use the same.

My invention relates to the preparation of a surface of solid aluminium for soldering.

It is well known that it is difficult to solder aluminium either to another piece of aluminium or to other metal. One of the chief difficulties is due to the presence upon the surface of the aluminium of a thin film of oxid of aluminium, which prevents a close and intimate contact between the aluminium and the metals in the solder applied to the aluminium in a state of fusion. This coating is refractory, and not usually dissolved by ordinary fluxes.

My invention has for its object the application to the surface of aluminium which is to be joined of a suitable flux which will dissolve the aluminium oxid. Metallic fluorids in a state of fusion possess the power to dissolve aluminium oxid more or less freely, but most metallic fluorids are unfit for application in a state of fusion to metallic aluminium for the purpose of removing the film of oxid, because their fusing-points are higher than that of aluminium. I have found, however, that mixtures of metallic fluorids with many other suitable substances may be made, which, while fusing at temperatures below the fusing-point of aluminium, possess the property in a state of fusion of cleaning the surface of the aluminium and of protecting it from atmospheric oxidation.

In general terms my invention consists in a new and useful flux for use in soldering aluminium, being a mixture composed of a metallic fluorid and of other suitable halogen salts such that the fusing-point of the mixture shall be lower than that of aluminium. I use the word "halogen" in the usual sense, to include chlorin, bromin, iodin, and fluorin.

I preferably employ the fluorid of a metal not reducible from such fluorid by aluminium. An example of a mixture containing such a fluorid, which I have found to be useful in preparing the surface of aluminium for soldering, is a mixture of aluminium fluorid ($Al_2F_6$) itself not fusible ordinarily with the easily-fusible chlorid of aluminium and sodium, ($Na_2Al_2Cl_8$.) A mixture composed of the fluorid of aluminium and sodium (cryolite) with the more easily fusible chlorid of aluminium and sodium is an excellent mixture for the purpose and is cheaper than the one previously mentioned. I make use of such a mixture for the purpose mentioned above by simply fusing it upon that part of the surface of the aluminium which is to be joined either to another surface of aluminium or to the surface of some other metal and at the same time or subsequently fusing upon the surface of aluminium thus prepared the desired solder, which may be any solder capable of making a firm joint with aluminium, the surface of which is chemically clean. While the solder is in a state of fusion, the two pieces of metal to be joined are brought together, when a firm joint will be formed; or the two pieces of metal may first be placed in such relative positions as is desired in the joint and the mixture thinly spread along the line of desired juncture. Then the flux and the mixture being heated to a state of fusing upon the aluminium I fuse the solder upon it in the ordinary way. A blow-pipe, Bunsen burner, or the hot soldering-bolt may be used successfully as a source of heat, and the solder may be spread, if necessary, upon the prepared surface of the aluminium by the soldering-bolt, or, in case the blow-pipe or burner is used as a source of heat, by means of a thin iron rod or other prepared tool.

I find it convenient to employ the fluxing mixtures in the form of sticks cast from the fused mixtures of the materials composing it; and when the fluxing mixture is caustic or deliquescent I cover it with a coating of melted paraffin or other similar easily-fusible material, which, upon cooling, protects it from the action of the air and makes it fit to be handled freely.

I do not limit myself to any particular mixture of the class herein described, nor to the use of any particular metallic fluorid, it being only necessary that the fusing-point of the mixture should be below that of aluminium and that the mixture should not contain anything harmful to the process.

Having described my invention, what I claim, and desire to secure by Letters Patent, is—

1. As a flux for use in soldering aluminium a mixture composed of a metallic fluorid and of other suitable halogen salts such that the fusing-point of the mixture shall be lower than that of aluminium, substantially as described.

2. As a flux for use in soldering aluminium, a mixture composed of the fluorid of a metal not reducible from such fluorid by aluminium, and of other suitable halogen salts such that the fusing-point of the mixture shall be lower than that of aluminium, substantially as described.

3. As an improved flux for use in soldering aluminium, a mixture composed of the fluorid of aluminium, the fluorid of sodium, and the chlorid of aluminium and sodium, substantially as described.

4. As an improved flux for use in soldering aluminium, a mixture composed of cryolite and the chlorid of aluminium and sodium, substantially as described.

FRANK A. GOOCH.

Witnesses:
MARY WYMAN,
SARAH W. GOOCH.